United States Patent [19]

Lund

[11] Patent Number: 5,978,806
[45] Date of Patent: Nov. 2, 1999

[54] METHOD AND APPARATUS FOR COMMUNICATING INFORMATION ABOUT A CALLED PARTY TO A CALLING PARTY

[75] Inventor: Arnold M. Lund, Sleepy Hollow, Ill.

[73] Assignee: Ameritech Corporation, Hoffman Estates, Ill.

[21] Appl. No.: 08/884,830

[22] Filed: Jun. 30, 1997

Related U.S. Application Data

[63] Continuation-in-part of application No. 08/801,880, Feb. 18, 1997.

[51] Int. Cl.[6] .................................................... G06F 17/30
[52] U.S. Cl. ................. 707/10; 395/200.31; 395/200.43
[58] Field of Search .................... 707/1, 5, 10, 100–104, 707/200–206; 370/384; 379/10, 220; 395/200.3, 200.54

[56] References Cited

U.S. PATENT DOCUMENTS

| | | | |
|---|---|---|---|
| 4,776,005 | 10/1988 | Petriccione et al. ..................... | 379/142 |
| 5,054,055 | 10/1991 | Hanle et al. ............................. | 379/142 |
| 5,220,599 | 6/1993 | Sasano et al. ........................... | 379/142 |
| 5,317,630 | 5/1994 | Feinberg et al. ...................... | 379/93.06 |
| 5,349,638 | 9/1994 | Pitroda et al. .......................... | 379/142 |
| 5,425,090 | 6/1995 | Orriss ..................................... | 379/201 |
| 5,430,719 | 7/1995 | Weisser, Jr. ............................ | 370/389 |
| 5,438,568 | 8/1995 | Weisser, Jr. ............................ | 370/389 |
| 5,467,385 | 11/1995 | Reuben et al. ........................ | 379/88.19 |
| 5,479,495 | 12/1995 | Blumhardt .............................. | 379/207 |
| 5,499,290 | 3/1996 | Koster .................................... | 379/242 |
| 5,511,109 | 4/1996 | Hartley et al. ............................ | 379/40 |
| 5,517,562 | 5/1996 | McConnell ............................. | 379/207 |
| 5,519,772 | 5/1996 | Akman et al. ......................... | 379/265 |
| 5,526,413 | 6/1996 | Cheston, III et al. ................. | 379/201 |
| 5,546,447 | 8/1996 | Skarbo et al. .......................... | 379/142 |
| 5,566,235 | 10/1996 | Hetz ....................................... | 379/201 |
| 5,572,582 | 11/1996 | Wheeler, Jr. et al. ................. | 379/202 |
| 5,633,922 | 5/1997 | August et al. .......................... | 379/220 |
| 5,644,619 | 7/1997 | Farris et al. .............................. | 379/27 |
| 5,687,212 | 11/1997 | Kinser, Jr. et al. ....................... | 379/10 |
| 5,708,780 | 1/1998 | Levergood et al. ............... | 395/200.59 |
| 5,712,979 | 1/1998 | Graber et al. ...................... | 395/200.54 |
| 5,742,763 | 4/1998 | Jones .................................... | 395/200.3 |
| 5,751,707 | 5/1998 | Voit et al. ............................... | 370/384 |
| 5,778,367 | 7/1998 | Wesinger et al. ......................... | 707/10 |

*Primary Examiner*—Ruay Lian Ho
*Attorney, Agent, or Firm*—Bruce E. Stuckman; A. Frank Duke; Kent E. Genin

[57] ABSTRACT

A method and apparatus is provided for automatically retrieving and displaying supplemental information about a called party on the customer premise equipment (CPE) of a calling party. When a caller places a call, the number called is used to look up and return to the caller the Universal Resource Locator (URL) of the called party. Application software resident in the caller's CPE uses the URL to retrieve the home page of the called party from the Internet.

5 Claims, 3 Drawing Sheets

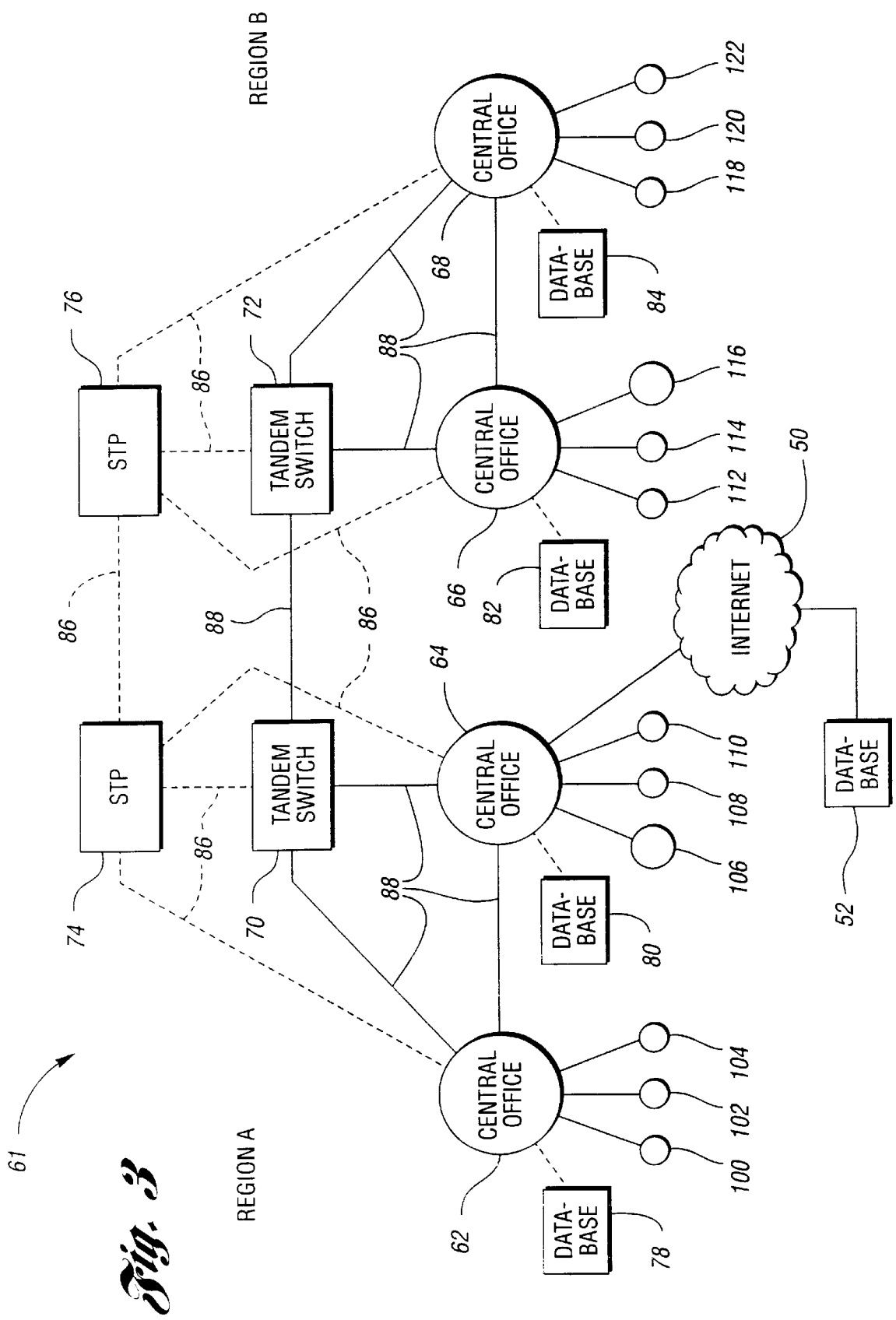

METHOD AND APPARATUS FOR COMMUNICATING INFORMATION ABOUT A CALLED PARTY TO A CALLING PARTY

CROSS-REFERENCE TO RELATED APPLICATIONS

This is a continuation-in-part of U.S. Ser. No. 08/801,880 entitled "Method and System for Providing Computer-Network Related Information about a Calling Party", filed Feb. 18, 1997 and assigned to the assignee of the present invention.

TECHNICAL FIELD

The present invention relates generally to telecommunication services using a public telephone network and more particularly to communicating information about a called party to the calling party.

BACKGROUND OF THE INVENTION

Local telephone service providers, through a central office, offer a variety of optional services to their customer. Some of these services provide information about a person placing a call (a calling party) to a person receiving the call (a called party). Customer premises equipment (CPE) of many offices and homes increasingly will integrate telephony and computers. This type of CPE can connect to a network environment that includes both a real or virtual telephone path and a real or virtual data path for access to a computer network such as the Internet. In addition to the conventional phone-computer setup, there is an emerging technology that integrates both a computer and a telephone into a single device, a so-called smart or intelligent phone that contains a built-in microprocessor capable of running applications, such as World Wide Web browsing software. Another example is Internet television with integrated telephony.

SUMMARY OF THE INVENTION

In accordance with the present invention a method and apparatus is provided that initiates two actions in response to the dialing of a telephone number. In addition to placing the call, supplemental information about the called party is automatically retrieved and displayed on the terminal of the calling party. This supplemental information allows the called party to communicate in a more detailed way with callers. For example, the called party might provide the caller with a high level calendar showing when the called party would be available to take calls. Preferably, in accordance with the present invention when a caller places a call, the number called is used to look up and return to the caller the Universal Resource Locator (URL) of the called party. Application software resident in the caller's CPE uses the URL to retrieve the home page of the called party from the Internet.

BRIEF DESCRIPTION OF THE DRAWINGS

FIG. 3 is a block diagram of a telephone network accessible by the CPE and including a central office that is not equipped with AIN software;

DESCRIPTION OF THE PREFERRED EMBODIMENTS

Figure 1:
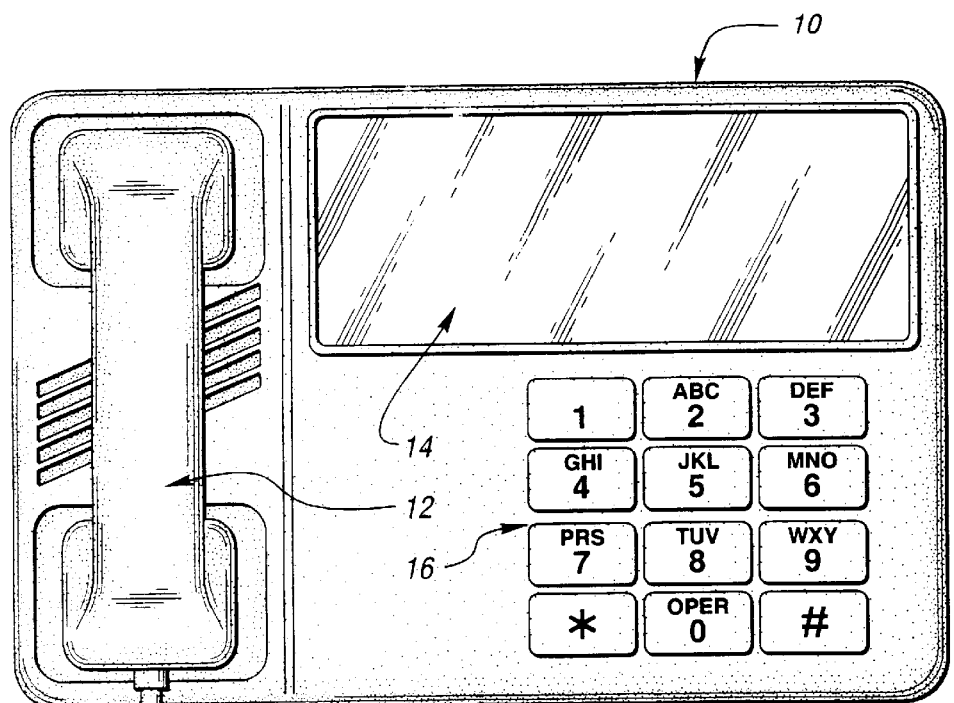
FIG. 1 is an illustration of a preferred embodiment of a CPE to be used in the present invention.

Referring now to the drawings and initially to FIG. 1, a CPE generally designated 10 is a smart or intelligent phone including a handset 12, a display 14 and a keyboard 16. A microcomputer (not shown) is located within the housing of the CPE and capable of communicating with a telephone network described hereinafter. The microcomputer is programmed to respond to inputs from the keyboard 16 and to provide output to the display 14. The CPE is also capable of connecting to the Internet via the telephone network using a modem or similar device connected with the microcomputer and preferable located within the housing of the CPE.

Figure 2:
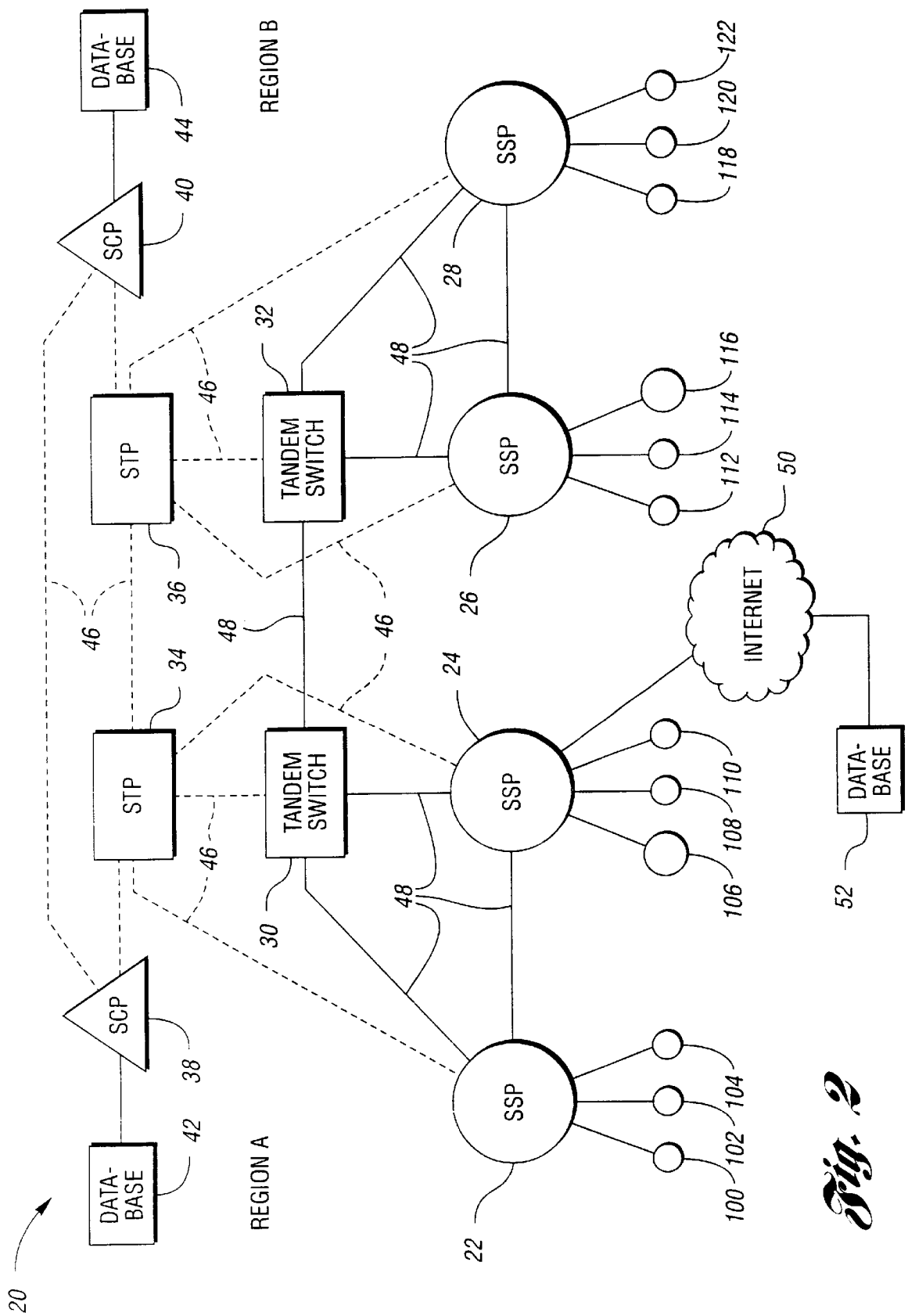
FIG. 2 is a block diagram of a telephone network accessible by the CPE and including a central office equipped with Advanced Intelligent Network (AIN) software.

Referring now to FIG. 2, there is depicted a modern AIN-based telephone network 20 divided into two regions (Region A and Region B). An Advanced Intelligent Network (AIN) SSP is a central office equipped with AIN software. AIN software can enable an SSP to suspend call processing and launch a query to an SCP. An SSP is similar to a local telephone central office equipped with a voice switch, well known to those skilled in the art. The network 20 includes signal switching points (SSP) 22, 24, 26, 28; tandem switches 30, 32; signal transfer points (STP) 34, 36; service control points (SCP) 38, 40; and databases 42, 44. The elements of the network 20 typically communicate over links 46 using network signaling protocols and over links 48 carrying voice and data traffic. A plurality of CPE's indicated at 100–122 have a real or virtual telephone line and a real or virtual data line and gain access to the network 20 by communicating voice and data to the SSPs 22–28. For example, the access line may be equipped with Asymmetric Digital Subscriber Loop (ADSL) technology, such that the voice path from the CPE is routed over the AIN network, but the CPE can also exchange data simultaneously with the Internet (accessed with an ATM switch contained within the SSP).

The SSPs 22–28 communicate voice and data traffic over links 48 to conventional tandem switches 30 and 32. The tandem switches transfer the voice and data traffic within or between regions of the network 20. It should be understood, however, that SSPs in different areas may also transfer voice and data traffic directly between each other without the use of a tandem switch.

Both the tandem switches 30 and 32, and the SSPs 22–28, transfer network signaling protocols over links 46 to the STPs 34 and 36. The network signaling protocols, such as those defined by the well known Signaling System 7, control the network switching of voice and data traffic.

STPs 34 and 36 transfer network signaling protocols over links 46 within or between regions and to SCPs 38 and 40. SCPs 38 and 40 may also directly transfer network signaling protocols between regions. The STPs and the SCPs preferably include a microprocessor controlled computer system using computer peripherals controlled by application software programmed to implement the appropriate communication functions. STPs and SCPs are available from a number of telephone switch vendors.

SCPs 38 and 40 handle the queries sent from a called party's SSP by communicating with databases 42 and 44. Preferably, these databases contain information identifying the types of services available to each CPE 100–122 and related information such as, but not limited to, FAX numbers, e-mail addresses, cellular numbers, and computer-network addresses, such as Internet location identifiers (e.g., (URLs)). The information may be stored in a memory storage device such as random access memory or a magnetic or optical disk drive, known to those skilled in the art. Of course, a combination of different memory storage devices or other types of devices may be used. The memory storage device preferably stores the service information in a data record such as an array, lookup or pointer table, or other data structures known to those skilled in the art.

The Internet indicated generally at 50 is shown for purposes of discussion as being accessed from the SSP 24. When accessing the Internet 50, a modem connected with the microcomputer of the CPE is connected through the SSP 24 to a modem provided by an Internet access provider, which in turn is connected to the Internet. A server connected with a data base is indicated at 52 and preferably store the URL associated with each telephone number of interest.

Figure 4:
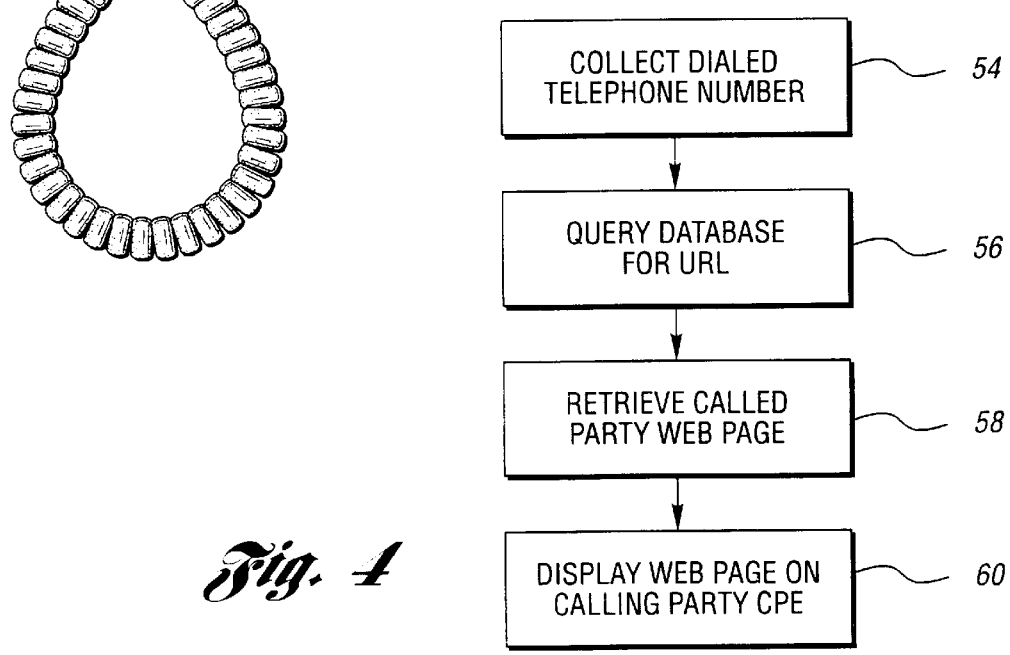
FIG. 4 is an illustration of the method of a preferred embodiment of the invention.

The method of providing the Web page of a called party to a calling party it illustrated by the diagram in FIG. 4 and comprises the steps of collecting the number dialed by an originating CPE, as a call is placed to the called party CPE, as indicated at block 54; querying a database 44 to retrieve the called party's URL based on the number dialed, as indicated in the block 56; using the URL to retrieve the called party's web page from a database 52, as indicated at block 58; and displaying the web page corresponding to that URL on the originating CPE 106 as indicated at block 60.

More particularly, with respect to FIG. 2, when a calling party, using for example CPE 106, lifts the telephone receiver and dials the number of a called party, using for example CPE 116, that number is sent to the calling party's SSP 24. The AIN software in the SSP 24 formulates and transmits a query to the SCP 40 via STP 36. The SCP 40 queries the database 44 to determine how to handle the call and what services to provide the calling and called parties (using information about the originating caller and the dialed number), and data over link 46 is sent to the SSP 26 of the called party to set up the call.

The SCP 40 also identifies the properties of the originating CPE 106, and determines whether it can display a Web page. If so, SCP 40 indexes the database 44 to obtain and transmit the URL associated with the dialed telephone number back to the originating CPE 106.

Once the originating CPE 106 receives the URL from the SSP 24, application software in the CPE 106 retrieves and display the Web page, associated with the URL, that is stored in an Internet server database 52 as is well known in the art. This application may be any of the well known Web browsing software available from various suppliers.

Alternatively, the CPE 106 may be provided with appropriate software and datalink connection permitting it to formulate and transmit a query directly to the SCP 40 via the STP 36. Other methods of querying a database can be used and the database can be local to the SCP, accessible over a connecting data network, or accessible remotely over a SS7 network.

FIG. 3 shows a non-AIN network 61 including central offices 62–68 equipped with standard switching equipment. The network 61 further includes tandem switches 70 and 72 and signal transfer points (STP) 74 and 76. Network 61 does not include SCP's as shown in the AIN-based network of FIG. 2. In this network an application processor in each of the central offices accesses databases 78–84. The elements of the network 61 typically communicate over links 86 using network signaling protocols and over links 86 carrying voice and data traffic. In this network the Internet 50 is accessed from the central office 64. When accessing the Internet 50, a modem connected with the microcomputer of the CPE is connected through the central office 64 to a modem provided by an Internet access provider, which in turn is connected to the Internet. As in FIG. 2, the Internet may also be accessed using ADSL or equivalent equipped access lines.

In FIG. 3, the method of providing the Web page of the called party to a calling party comprises the steps of collecting the telephone number dialed by the calling party with an application running at the Central Office 64, querying a database 80 to retrieve the called party's URL, returning the URL to the calling party's CPE, where the Web page corresponding to that URL is retrieved and displayed.

More particularly, when the calling party lifts the telephone receiver, located at CPE 106, and dials the number of the receiver of the called party, located at CPE 116, that number is sent to the corresponding central office, here central office 64. When the calling party's central office 64 receives the digits, the string is passed to an application processor in the central office that queries a database 80. The central office also sends the digits in a network signaling protocol to the STP 76, which sets up the routing of the call in the usual manner. The database 80 indexes telephone numbers to URLs, and the URL of the dialed number is returned to the calling party's CPE 106. Once the calling party's CPE receives the URL from the central office 64, an application in the CPE 106 can retrieve and display the Web page associated with the URL, as is well known in the art. This application may be any of the well known Web browsing software available from various suppliers.

Providing the Web page of the called party to a calling party is not dependent upon a specific network such as shown in FIGS. 2 and 3. The calling party's CPE may use the dialed telephone number to query a database on the Internet to retrieve the called party's URL, and display the Web page corresponding to that URL. Other methods besides those disclose for querying a database can be used and the database can be local, accessible over a connecting data network, or accessible remotely. Instead of using databases located within the phone network, a directory database located on the Internet, that contains URLs referenced to phone numbers, would is used. After collecting the phone number that is dialed, the CPE runs an application that will index the Internet directory database to retrieve the URL associated with the calling party's number. Once the calling party's CPE receives the URL, an application in the CPE can retrieve and display the Web page associated with the URL, as is well known in the art. This application can be any well known Web browsing software. Alternatively, instead of merely sending back the URL of a location on the computer network containing the customized information, the aforementioned application run by the CPE can return the Web page itself.

While this description has referenced URLs, other computer-network addresses would work as well. While it has referenced the Internet, other computer networks could be used. While it has referenced Web pages, other customized user files could be used.

The preferred CPE arrangements on the caller side include the smart telephone with a display and application processor as described. A CPE specifically designed to receive and display the customized user files could also be used, as well as a personal computer with a telephone and a data network interface. Other equivalent devices could be used including the so called "thin client," where the serving processor has a telephone and data network interface, as well as a telephone and a computer coordinated by a network application. Other CTI capable devices with the dual real or virtual channel capability (voice over data, or data over voice) could be used, and these might include PDSs, cellular phones with data displays, and so on. Even specialized devices such as a version of a WebTV box running a browser with a built-in Internet telephone could be appropriately modified and used.

Several databases storing the computer-network address indexed to the telephone number were mentioned above. These could also include known databases such as the Directory Assistance database, and future databases (e.g., inside the called party's smart telephone itself, where an incoming call might prompt a customized user file to be returned before the phone is answered).

While the best mode for carrying out the present invention has been described in detail, those familiar with the art to which this invention relates will recognize various alternative designs and embodiments for practicing the invention as defined by the following claims.

What is claimed is:

1. A method of communicating information about a called party to a calling party comprising a sequence of the following steps:

collecting a number of the called party;

accessing a database to retrieve an address for locating a customized file of the called party;

transmitting the address to a telephone at the calling party's premises, the telephone including a keyboard for entering said number and a display for displaying said customized file;

retrieving the customized file for use by the calling party's telephone; and connecting the called party with the calling party over a telephone network using the number of the party called.

2. The invention defined by claim 1 wherein said telephone includes a microcomputer and a modem for connecting with the Internet, said address is the Universal Resource Locator (URL) associated with the called party's telephone number, and said file is the World Wide Web Page of the called party.

3. The invention defined by claim 1 wherein said telephone includes a microcomputer connected with the Internet via a signal switching point (SSP) of an advanced intelligent network (AIN)-based telephone network, said address is the Universal Resource Locator (URL) associated with the called party's telephone number stored in a database connected with the Internet, and said file is the World Wide Web Page of the called party.

4. The invention defined by claim 1 wherein said telephone includes a microcomputer connected with the Internet via a central office of a telephone network, said address is the Universal Resource Locator (URL) associated with the called party's telephone number stored in a database connected with the Internet, and said file is the World Wide Web Page of the called party.

5. The invention defined by claim 1 wherein said calling party's telephone is located at the calling party's premises and is used to generate the number.

\* \* \* \* \*